May 27, 1969     M. J. WOODWARD     3,446,192
FOUR-CYCLE INTERNAL COMBUSTION ENGINE
Filed Sept. 5, 1967
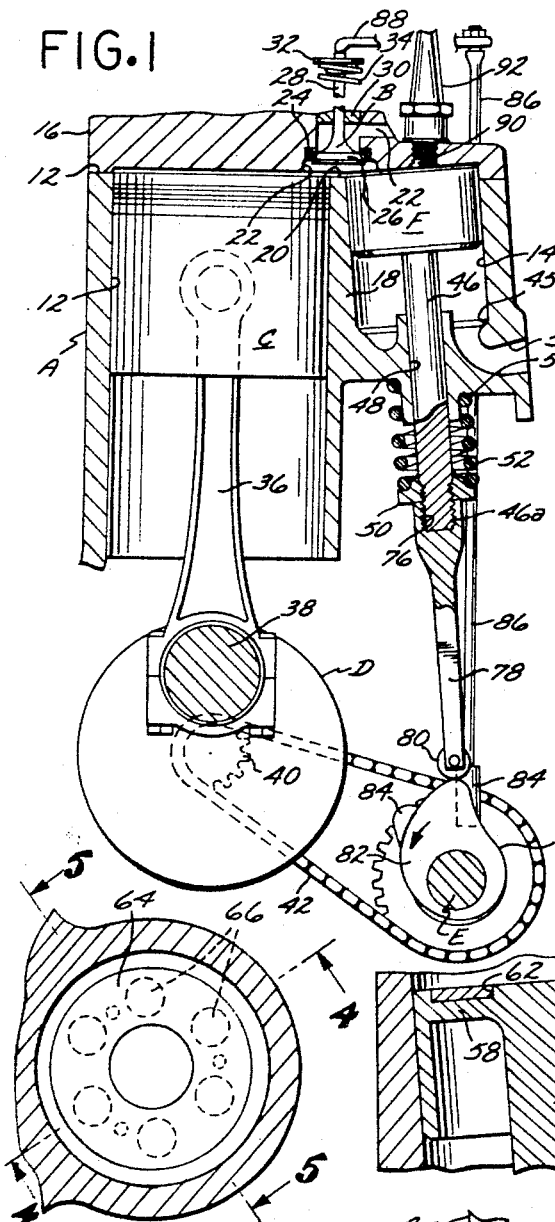
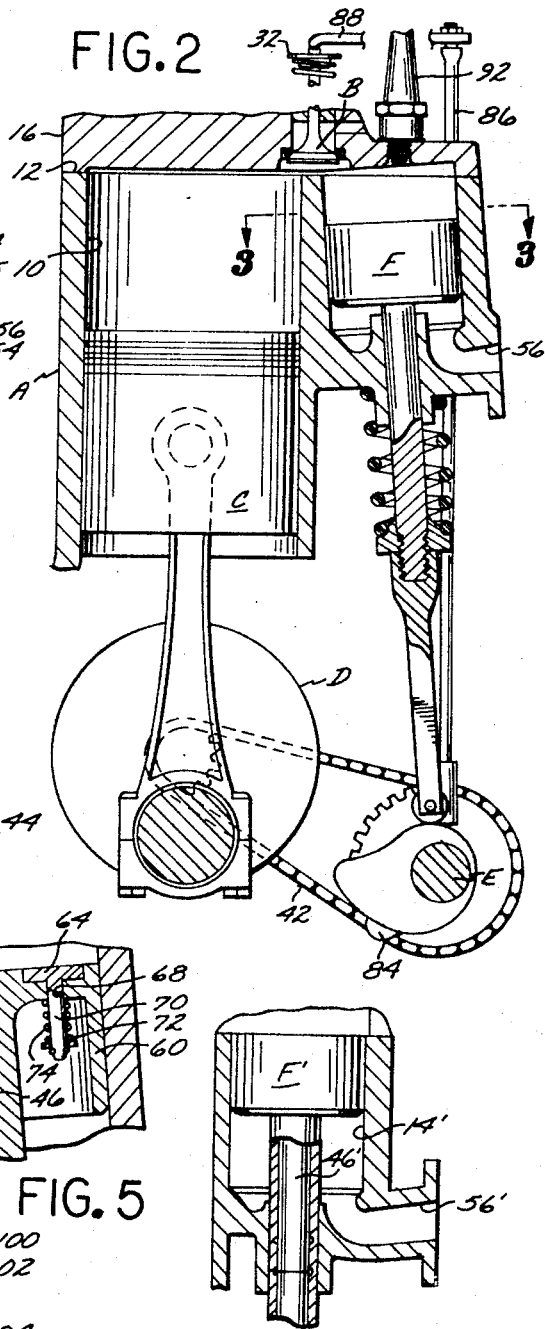
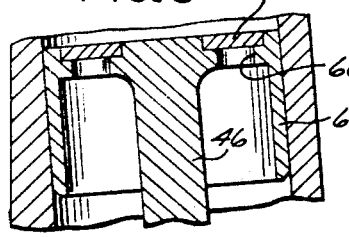
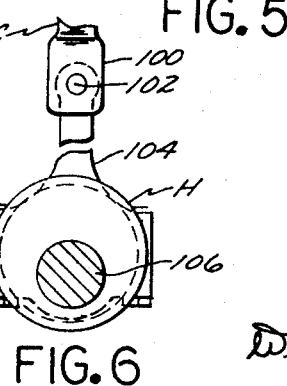
INVENTOR.
MITCHELL J. WOODWARD
BY
William G. Babcock
ATTORNEY The United States Patent Office 3,446,192
Patented May 27, 1969

3,446,192
FOUR-CYCLE INTERNAL COMBUSTION ENGINE
Mitchell J. Woodward, 9136 Artesia Blvd.,
Bellflower, Calif. 90706
Filed Sept. 5, 1967, Ser. No. 665,401
Int. Cl. F02b 75/04, 25/08; F01l 11/00
U.S. Cl. 123—78
7 Claims

ABSTRACT OF THE DISCLOSURE

An internal combustion engine having a plurality of firing chambers in the block adjacent the cylinder openings therein and connected thereto, with a plurality of valved pistons being reciprocably movable in said chambers in such a manner that gaseous fuel is discharged into the upper portion of each of said chambers as the piston in the cylindrical opening associated with that cylindrical opening moves through an intake and compression stroke. Each of said valved pistons move from a lowermost to an uppermost position in one of said chambers to discharge all products of combustion from said chamber as the piston in said cylindrical opening associated with that chamber moves through a power and exhaust stroke, whereby said engine, due to the structure thereof, provides improved operating characteristics and discharges a minimum of partially burned fuel into the ambient atmosphere.

BACKGROUND OF THE INVENTION

Field of the invention

An improved four-cycle internal combustion engine of increased efficiency, and one that discharges a minimum quantity of unconsumed fuel into the ambient atmosphere.

Description of the prior art

Four-cycle internal combustion engines available heretofore have included a plurality of first pistons reciprocally mounted in cylinder openings in a cylinder block and connected to a crankshaft which is driven by the reciprocal motion thereof. Such an engine is powered by the sequential firing of charges of gaseous fuel disposed in spaces between the head and pistons when the pistons approach the end of their compression strokes. Products of combustion, as well as partly burned fuel, are not completely discharged from the cylinder openings as the pistons complete their exhaust strokes, for the pistons at the top of their exhaust strokes are spaced a substantial distance from the head of the engine. As each fuel charge is drawn into one of the cylindrical openings during operation of the engine, it is contaminated with products of combustion and partially burned fuel from the previous firing, with a resultant lowering of efficient engine operation, as well as discharge of an excessive quantity of smog-causing products of combustion into the ambient atmosphere.

By the use of the present invention, all products of combustion and unconsumed fuel are discharged from the cylinder openings prior to delivery of the next fuel charge thereto, with an increased operational efficiency being achieved by means of the engine, with a minimum of smog-causing products of combustion being discharged into the ambient atmosphere therefrom.

SUMMARY OF THE INVENTION

A four-cycle internal combustion engine containing a plurality of firing chambers connected to the cylinder openings in the block in which the crankshaft that drives first pistons are reciprocally mounted, with each firing chamber having a valved second piston mounted therein that reciprocates the length thereof each time the first piston associated therewith completes a firing cycle. The first and second pistons cooperate to provide not only firing spaces of predetermined magnitude, but to discharge all products of combustion and partially burned fuel from each pair of cylinder openings and firing chambers, all to the end of increased operating efficiency of the engine and minimal discharge of smog-causing products of combustion into the ambient atmosphere.

A major object of the present invention is to provide an improved, four-cycle, internal combustion engine having increased operational efficiency over engines of this type available heretofore, and one that will discharge a minimum of smog-causing products of combustion into the ambient atmosphere.

BRIEF DESCRIPTION OF THE DRAWING

FIGURE 1 is a vertical, cross-sectional view of the improved engine, with the crankshaft driving a first piston positioned to start a fuel intake stroke, and a second piston associated with said first piston in a position to start a downward stroke in a cylindrical firing chamber;

FIGURE 2 is the same vertical, cross-sectional view shown in FIGURE 1 but showing the first piston at the start of the exhaust stroke, and the second piston moving upwardly in the firing chamber;

FIGURE 3 is a fragmentary, transverse, cross-sectional view of the device, taken on the line 3—3 of FIGURE 2;

FIGURE 4 is a vertical, cross-sectional view of the engine, taken on the line 4—4 of FIGURE 3;

FIGURE 5 is a vertical, cross-sectional view of the engine, taken on the line 5—5 of FIGURE 3;

FIGURE 6 is a combined vertical, cross-sectional and end elevational view of an alternate form of actuation for one of the second pistons; and FIGURE 7 is a fragmentary, transverse, cross-sectional view of the cylinder block and an alternate form of second piston.

DESCRIPTION OF THE PREFERRED EMBODIMENT

The engine, as may best be seen in FIGURES 1 and 2 of the drawing, includes a cylinder block A in which a number of spaced cylinder openings 10 extend downwardly from a first surface 12 of the block. In the drawing but one cylinder opening 10 is shown, as the balance of the openings are of identical form and configuration. A number of cylindrical chambers 14 are also formed in the block A, and are located adjacent to the cylinder openings 10. Each of the chambers 14 (FIGURES 1 and 2) is angularly disposed relative to the cylinder opening 10 with which it is associated, for reasons that will later be explained.

A cylinder head 16 is mounted on the first surface 12 of the block A and closes the upper ends of the cylinder openings 10 and chambers 14. At the junction thereof, the block A and the cylinder head 16, as can be seen in FIGURES 1 and 2, cooperatively define a number of transverse passages 20, each of which serve to connect the upper portion of one of the cylinder openings 10 and the chamber 14 associated therewith. Each passage 20 is in communication with an exhaust port 22 formed in the head 16, which exhaust port is partially defined by a valve seat 24 in the manner of conventional engine construction.

A number of exhaust valves B are provided, each of which includes a head 26 and a stem 28. The stems 28 are slidably disposed in guides 30 that are individually mounted in the upper portion of one exhaust port 22. A spring retainer 32 is mounted on the upper end of each valve stem 28, and a compressed helical spring 34 abuts against the spring retainer. Each spring 34 at all times tends to maintain the valve B with which it is associated in a closed position on one of the valve seats 24, as shown in FIGURE 1.

A piston C is mounted in each cylinder opening 10, as shown in FIGURES 1 and 2. Each piston C is movably connected to a connecting rod 36 that extends downwardly in one of the cylinder openings 10, and is connected to one of the throws 38 of a crankshaft D which is rotatably supported by conventional means below the cylinder block A. A first sprocket 40 is mounted on the crankshaft D and engages an endless chain belt 42 extending to a second sprocket 44 that is mounted on a camshaft E rotatably supported at a fixed position below the cylinder block A by conventional means (not shown). The diameter of the first sprocket 40 is such that the camshaft E is rotated one revolution for each two revolutions of the crankshaft D.

A number of second pistons F are provided, each of which is slidably mounted in one of the chambers 14 as shown in FIGURES 1 and 2. When each piston F is in the lowermost position in the chamber 14 in which it is slidably mounted, it is disposed on a seat 45, one of which is also shown in FIGURES 1 and 2. Each second piston F is rigidly connected to the upper extremity of an elongate rigid rod or tube 46 which extends downwardly through an elongate bore 48 formed in the cylinder block A. The lower end of each of the rods 46 is threaded and engaged by a nut 50.

A compressed helical spring 52 is provided for each of the rods 46, with the spring encircling the lower portion of the rod and abutting against the upper face of the nut 50 and a surface portion 52 of the block A in the manner shown in FIGURES 1 and 2. Each of the springs 52 at all times tends to move the rod 46 and second piston F associated with that rod to a position where the second piston F is disposed on one of the seats 45.

A number of fuel inlet passages 56 are formed in block A that are in longitudinally spaced relationship with each passage extending inwardly and upwardly through the block to communicate with the lower portion of one of the chambers 14 (FIGURES 1 and 2). Each of the second pistons F illustrated in FIGURES 4 and 5 includes a head 58 provided with a skirt 60 that projects downwardly from the outer circumferential edge thereof, and the interior central portion of each head is connected to a rod 46. A downwardly extending ring-shaped recess 62 is formed in the upper portion of each piston head 58 in which a ring-shaped valve member 64 is movably disposed. The recesses 62 communicate with a number of circumferentially spaced, downwardly extending passages 66 formed in the heads 58.

A number of circumferentially spaced, upwardly extending bores 68 are formed in the piston heads 58, as best seen in FIGURES 3 and 5. Pins 70 are slidably mounted in the bores 68, and the upper ends of these pins are rigidly connected to the under surface of the ring-shaped valve member 64 by conventional means. A protuberance 72 is formed on the lower end of each pin 70.

A helical spring 74 encircles each of the pins 70. The lower ends of the compressed springs abut against the protuberances 72, and the upper ends of the springs are in pressure contact with the lower surfaces of the heads 58 (FIGURE 5) to at all times tend to maintain the valve members 64 in the positions shown in FIGURE 4 whereby the upper ends of the passages 66 are sealed relative to the upper portions of that chamber 14 with which they are associated.

Each rod 46 (FIGURES 1 and 2) has a lower threaded end 46a that engages a tapped recess 76 formed in the upper end of an elongate rigid member 78 that rotatably supports a roller 80 on the lower end thereof. Each roller 80 is at all times maintained in rolling contact with one of a number of first longitudinally spaced cams 82 forming a part of camshaft E, as best shown in FIGURES 1 and 2. Camshaft E also includes a number of second longitudinally spaced cams 84, one of which is shown in FIGURE 2. These cams 84 are at all times engaged by tappets or hydraulic valve lifters 85 that are operatively associated with a number of push rods 86 which extend upwardly to actuate conventional rocker arm assemblies 88, as illustrated in FIGURE 1.

A plurality of tapped bores 90 are formed in the cylinder head 16 above chambers 14, with each of these bores serving as a mounting for a conventional spark plug 92, or other fuel ignition means. Due to the differential in diameter between the sprockets 40 and 44, as each first piston C completes an intake and compression stroke, the second piston F associated therewith moves from an uppermost position (FIGURE 1) to a lowermost position where it is disposed on one of the seats 45.

On the intake stroke of each first piston C, a negative pressure is created in the upper portion of the cylinder opening 10 in which it is mounted, as well as in the upper portion of the chamber 14 associated therewith. This negative pressure in each chamber 14 causes the valve member 64 therein to move upwardly to permit fuel in that one of the passages 56 associated with that particular chamber through the passages 66 and discharge into the upper portion of the chamber 14 and cylinder opening 10.

The firing cycle of each of the first pistons C after the intake stroke is as follows. Piston C starts its upward movement in one of the cylinder openings 10, whereby the fuel mixture previously discharged therein begins to be compressed. A positive pressure is then created in that portion of the cylinder opening 10 above the piston C, as well as in that portion of the chamber 14 associated therewith above piston F. Second valve member 64 in this part of the cycle is closed by expansion of the spring 74.

When the piston C approaches the end of its compression stroke, the spark plug 92 associated with that particular piston is fired by conventional means (not shown) to explode the charge of fuel in chamber 14 above the piston F therein. Each of the cams 82 is so selected as to shape that as the charge of fuel in the chamber 14 with which the cam is associated is exploded, the piston F in that chamber is disposed on the seat 45 therein, and no downward thrust is exerted on any one of the rods 46 and members 78 to be transmitted to the cam 82.

After the first piston C has completed its exhaust stroke, a second cam 84 forming a part of cam shaft E moves a push rod 86 upwardly to actuate one of the rocker arms 88, and move a particular one of the valves V downwardly to permit products of combustion and unconsumed fuel to discharge through one of the ports 22 into the ambient atmosphere.

Each of the cams 82 is of such configuration that the second piston F moves from the lowermost position in the chamber 14 in which it is slidably mounted to the uppermost portion therein as the first piston C with which it is associated moves through the exhaust stroke.

Due to the upper movement of each of the second pistons F, as the first piston C with which it is associated completes its exhaust stroke, all of the products of combustion are discharged through the appropriate one of the exhaust ports 22. From the structure shown in FIGURES 1 and 2, as well as the above description, it will be seen that substantially all of the products of combustion are discharged from each cylinder opening 10 and chamber 14 associated therewith at the completion of a firing cycle. The configuration of the second cam 84 is such that the rocker arm assembly 88 associated therewith allows one of the springs 34 to dispose the valve B associated therewith in the closed position shown in FIGURE 1 at the completion of the firing cycle.

The reason for disposing each of the chambers 14 at an outwardly and downwardly extending angle relative to the cylinder opening 10 associated therewith is to provide greater space between the crankshaft C and camshaft E than would be possible if both the cylinder opening 10 and chamber 14 associated therewith were vertically positioned.

Each of the cams 82 is so selected as to shape, that the rate of movement of the second piston F associated therewith is accentuated at the beginning of the downward stroke, as well as the beginning of the upward stroke. This accentuation of rate of movement on the downward stroke assures an early opening of the second valve member 64 to permit a flow of gaseous fuel upwardly through the passages 66 into that portion of the chamber 14 above the second piston F. Accentuation of rate of movement on the upward stroke of each second piston F assures a substantially complete discharge of the products of combustion from the chamber 14 with which the second piston F is associated, prior to the valve B assuming the closed position, as shown in FIGURE 1.

It will be apparent that if desired, two camshafts E rather than a single camshaft may be provided to actuate the members 78 and the push rods 86 in the operation of the engine. Of course, if two camshafts E are utilized, two timing belts 42 would be necessary to actuate the same from the crankshaft D.

A second means of actuating the second pistons F in timed sequence relative to the first piston C is shown in FIGURE 6, and in this case, each of the elongate rods 46 is formed with a bifurcated end 100 having a pin 102 extending transversely thereacross. Each of the pins 102 movably engages the upper end of a second connecting rod assembly 104. Each connecting rod assembly 104 rotatably engages a throw 106 of a second crankshaft H that occupies a spaced position relative to the first crankshaft D below the cylinder block 10 in the same manner as the camshaft E.

The second crankshaft H is rotated in timed sequence relative to the first crankshaft D by sprockets and a chain belt 42, as previously described in conjunction with the camshaft E. The second camshaft H rotates one revolution for each two revolutions of the crankshaft D. As the crankshaft H is rotated, it moves each of the second pistons F downwardly from an uppermost to a lowermost position in one of the chambers 14 each time the first piston C associated with that particular piston F completes an intake and compression stroke. Each time one of the first pistons C completes a power and exhaust stroke, the second crankshaft H serves to move the second piston F associated therewith from a lowermost position in one of the chambers 14 to an uppermost position therein to discharge all of the products of combustion through one of the exhaust ports 22.

In FIGURE 1 it will be seen that each first piston C and second piston F associated therewith are very closely positioned to the interior surface of the cylinder head 16 upon completion of the exhaust stroke, as well as the initial position for the intake stroke, whereby a minimum of fuel contamination occurs as the fuel is drawn into the chambers 14. Should it be desired, the throws 106 may be formed on the camshaft E, and as a result but one belt 42 would be required in utilizing the second form G of the invention.

I claim:

1. A four-cycle internal combustion engine, in combination:
   (a) a cylinder block having a plurality of spaced chambers and spaced cylinder openings extending inwardly from a first surface of said block, with each of said chambers having a seat adjacent an inner portion thereof, and a purality of fuel inlet ports in said block, each of which is in communication with an inner portion of one of said chambers;
   (b) a crankshaft rotatably supported in a fixed position relative to said block below said cylinder openings;
   (c) a plurality of first pistons slidably mounted in said cylinders;
   (d) first means connecting said first pistons and crankshaft for rotating said crankshaft as said pistons reciprocate in said block;
   (e) a cylinder head mounted on said first surface for closing the outer ends of said cylinder openings and chambers, in which head a plurality of exhaust ports are formed, with each of said exhaust ports being in communication with one of said cylinder openings and the one of said chambers most adjacent thereto;
   (f) a plurality of second pistons slidably mounted in said chambers;
   (g) normally closed differential-pressure-actuated valve means on said second pistons that open passages in said second pistons when a negative pressure exists in said chambers outwardly from said second pistons;
   (h) a plurality of exhaust valves which normally close said exhaust ports;
   (i) second means for sequentially moving each of said exhaust valves to a position where that exhaust port with which one of said valves is associated is open as the one of said first pistons in said cylindrical opening connected to said exhaust port moves through an exhaust stroke;
   (j) third means for sequentially moving each of said second pistons from an uppermost position in one of said chambers to a lowermost position therein as the first piston with which said second piston is associated moves through an intake stroke and substantially all of a compression stroke, with each of said first pistons in moving through said intake stroke creating a negative pressure in said cylindrical opening in which it moves and said chamber associated therewith to open said valve means on said second piston to draw gaseous fuel through one of said intake ports into one of said chambers, and with each of said first pistons as it moves upwardly on said compression stroke creating a positive pressure on said gaseous fuel in that one of said cylindrical openings and chambers associated therewith to close said valve means on one of said second pistons, and as each of said first pistons completes said compression stroke, the compressed gaseous fuel is substantially disposed in one of said chambers, which third means on the power and exhaust stroke of each of said first pistons moves that one of said second pistons associated therewith from a lowermost to an uppermost position in the one of said chambers in which said second piston is slidably mounted to discharge the products of combustion therefrom; and
   (k) ignition means for sequentially firing the gaseous fuel charge in said chambers as said second pistons move to the lowermost positions therein, with each gaseous fuel charge as fired expanding into the cylindrical opening associated with that chamber to drive the one of said first pistons mounted therein downwardly to rotate said crankshaft.

2. An engine as defined in claim 1 which further includes:
   (l) a camshaft rotatably supported in a fixed position relative to said cylinder block; and
   (m) fourth means for driving said camshaft from said crankshaft in such a manner that said camshaft makes one revolution for each two revolutions of said crankshaft, with said camshaft actuating both said second and third means.

3. An engine as defined in claim 2 which further includes:
   (n) a plurality of seats in the inner portions of said chambers against which said second pistons abut when in their lowermost positions in said chambers to prevent transmittal of the force of exploding charges of fuel in said chambers to said camshaft.

4. An engine as defined in claim 3 wherein said camshaft includes a plurality of longitudinally spaced first cams, and said second means further includes:

(o) a plurality of rods affixed to inner portions of said second pistons, which rods are slidably supported in bores in said cylinder block and extend therebelow, with said rods having threads formed on the projecting portions thereof;

(p) a plurality of nuts that engage said threaded ends of said rods;

(q) a plurality of compressed helical springs that encircle the projecting portions of said rods and abut against portions of said cylinder block and nuts to at all times tend to move said rods to positions where said second pistons are disposed on said seats;

(r) a plurality of elongate rigid members co-axially aligned with said rods, in first ends of which members tapped recesses are formed that engage said threads on said rods; and (s) a plurality of rollers rotatably supported on second ends of said members which at all times abut against said first cams due to the action of said compressed springs.

5. An engine as defined in claim 4 wherein said camshaft includes a plurality of longitudinally spaced second cams, said exhaust valves are spring-loaded and tend to remain in an exhaust port closing position, and said third means includes:

(t) a plurality of push rods that are reciprocated by said second cams; and (u) a plurality of rocker arm assemblies actuated by said push rods for opening said valves on the exhaust strokes of said first pistons.

6. An engine as defined in claim 1 wherein each of said second pistons includes a head from which a skirt depends, and on the outer surface of which head a circular recess is formed, with a plurality of passages extending through said head in communication with said recess, and said valve means further includes:

(l) a ring disposed in said recess which seals said passages; and (m) spring means that at all times tend to maintain said ring in a passage-sealing position in said recess.

7. An engine as defined in claim 6 which further includes a second crankshaft embodying a plurality of throws, which crankshaft is driven by said first crankshaft and rotates one revolution for each two revolutions of said first crankshaft, and said third means comprises a plurality of connecting rods that are rotatably connected to said throws and to said second pistons.

References Cited

UNITED STATES PATENTS

| | | | |
|---|---|---|---|
| 1,521,077 | 12/1924 | Clegg | 123—47 |
| 1,564,009 | 12/1925 | Myers. | |
| 1,642,655 | 9/1927 | Hart. | |
| 1,866,774 | 7/1932 | Maher | 123—47 |
| 2,018,944 | 10/1935 | Castle. | |
| 2,369,738 | 2/1945 | Johnson. | |
| 2,495,978 | 1/1950 | Maxwell. | |

FOREIGN PATENTS

| | | |
|---|---|---|
| 396,794 | 8/1933 | Great Britain. |
| 515,107 | 11/1939 | Great Britain. |
| 43,788 | 7/1888 | Germany. |

WENDELL E. BURNS, *Primary Examiner.*

U.S. Cl. X.R.

123—47, 51, 53